Feb. 16, 1954

O. H. BANKER 2,669,330

HYDRAULIC CONTROL FOR STEERING CLUTCHES

Filed Nov. 5, 1948

INVENTOR.
Oscar H. Banker,
BY
Cromwell, Greist + Warden
Attys

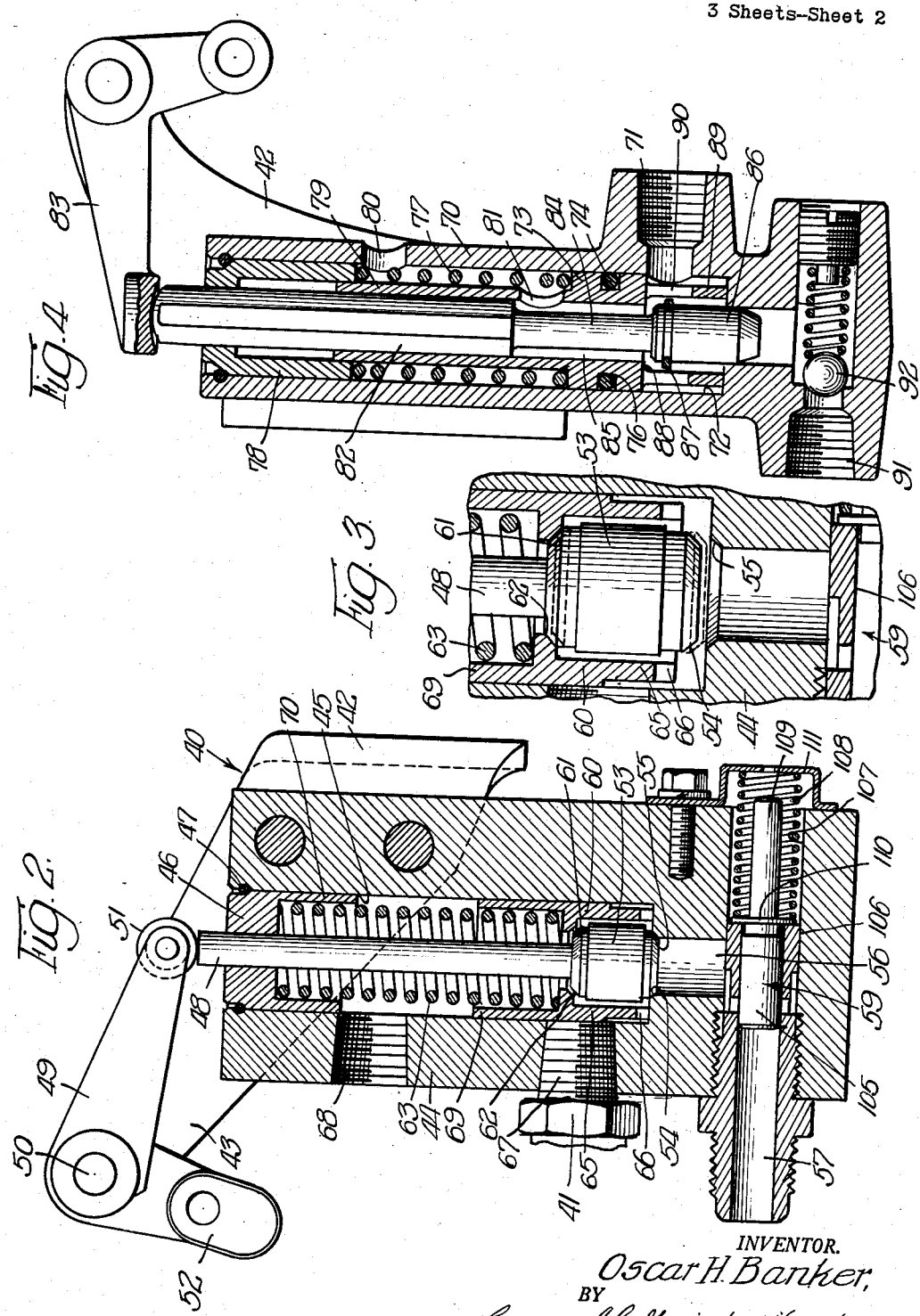

Feb. 16, 1954
O. H. BANKER
2,669,330
HYDRAULIC CONTROL FOR STEERING CLUTCHES
Filed Nov. 5, 1948
3 Sheets-Sheet 3
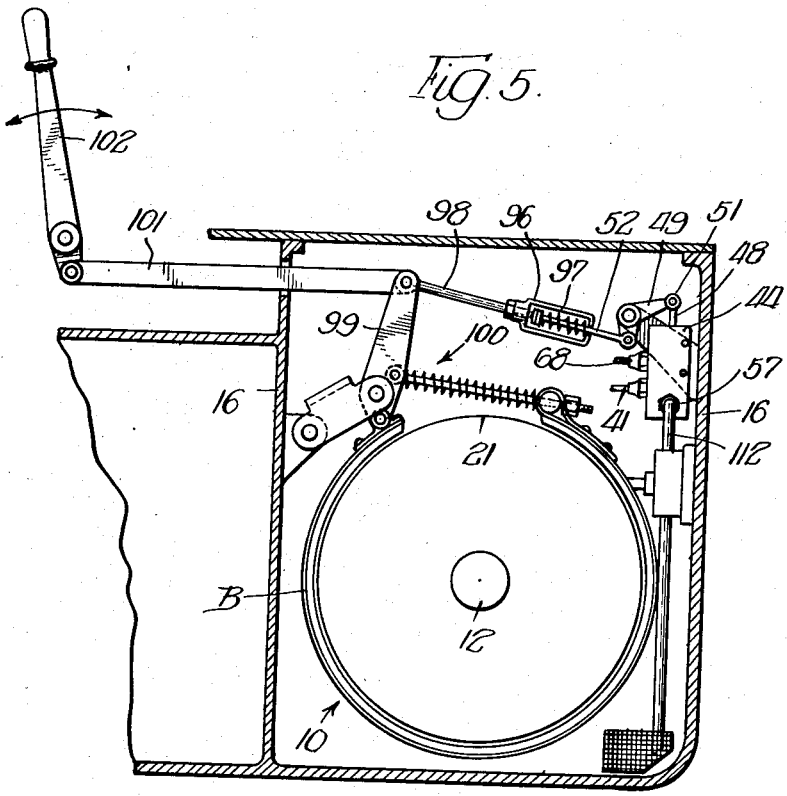
Fig. 5.
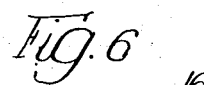
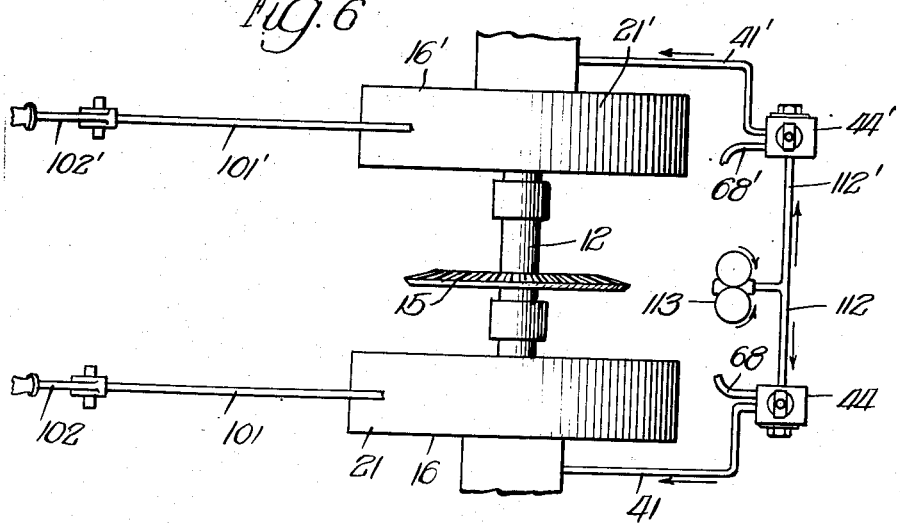
Fig. 6.
INVENTOR.
Oscar H. Banker,
BY
Cromwell, Greist & Warden
ATTYS.

Patented Feb. 16, 1954

2,669,330

UNITED STATES PATENT OFFICE 2,669,330

HYDRAULIC CONTROL FOR STEERING CLUTCHES

Oscar H. Banker, Evanston, Ill., assignor to New Products Corporation, Chicago, Ill., a corporation of Delaware Application November 5, 1948, Serial No. 58,414

26 Claims. (Cl. 192—13)

The present invention pertains to an improved hydraulically controlled, steering clutch mechanism and to an improved valve for variably dropping the hydraulic operating pressure to provide for a variable torque, slip-drive operation of said mechanism.

Conventional hydraulically controlled clutch and related mechanisms which employ the principle of providing a variable hydraulic operating pressure, operate on the theory of building up the hydraulic pressure from a minimum to full line pressure in the control cylinder of said mechanism, to thereby accomplish a variable slip-drive through the latter mechanism. In contrast to this mode of operation, the operation of the present mechanism, as preferentially embodied in a steering clutch for tractor type vehicles, is based on the principle of effecting a graduated reduction or dumping of the pressure effective on certain friction elements of the control mechanism from normal, full, clutch-operating line pressure, in which a direct non-slip drive is accomplished, to zero, fully dumped pressure. In said last condition said friction elements are operatively decoupled from one another. The pressure is gradually diminished by means of an improved variable pressure reduction valve under the manual control of an operator to produce any desired degree of clutch slip.

My copending application Serial No. 778,382, filed October 7, 1947, now Patent No. 2,580,381, illustrates and describes a planetary type driving and steering mechanism for tractors or like crawler-type vehicles, characterized by the fact that the degree of turn of the vehicle on its endless tracks is controlled, as in the present application, by the gradual release of the hydraulic liquid which is normally effective on a clutch of said mechanism from full line pressure down to a zero pressure, fully dumped condition. The graduated pressure reduction valve which constitutes the main subject matter of the present invention is particularly well suited for application to a driving and steering mechanism of this type.

It is an object of the invention to provide a friction driving or like mechanism of a type which is controlled in the operation thereof by variably reducing the hydraulic pressure operative on certain friction elements thereof, in combination with an improved, graduated pressure reduction valve adapted to effect the desired, gradual dumping of the hydraulic control or operating liquid for the purpose referred to.

Another object of the invention is to provide a pressure reduction valve of the foregoing type, adapted to be manually controlled by an operator to effect the aforesaid gradual release of pressure, which valve is simple, sturdy and inexpensive in its parts, yet adapted for a long life of satisfactory operation with little or no attention or maintenance.

More specifically, it is an object of the invention to provide a graduated pressure reduction valve including a valve housing adapted to be connected between a pump or like source of hydraulic pressure and a mechanism to be variably controlled by selective reduction of pressure operative thereon, and a pair of coaxial, telescoped valve elements in said housing which are subject to pressure from said source and are adapted to be manually controlled in a fashion to progressively dump hydraulic liquid from said mechanism, said elements being automatically shiftable relative to one another under the influence of hydraulic pressure from said source acting in opposition to a predetermined spring load, being manually controlled by the operator to produce a desired variable decrease in pressure effective on said mechanism.

Another specific object of the invention is to provide a reduction valve including a pair of valves and by-pass elements mounted for coaxial relative movement in a valve housing, one thereof being spring urged in its movements in opposition to the pressure of hydraulic liquid from a suitable source and the other thereof being manually actuable by an operator in opposition to said pressure whereby to optionally expose or close a by-pass path between said elements for the graduated release and dumping of hydraulic pressure as desired.

A still further object is to provide a hydraulically controlled driving clutch assembly which is particularly well adapted for installation in endless track laying vehicles to afford a wide range of steering or turning radii, ranging from a very gradual turn to a dead track turn or full pivot, wherein a pair of like assemblies controlling the respective tracks of the vehicle each includes an individual, variable pressure dropping control valve of the sort referred to above, said valves being supplied by a common source of hydraulic power and having improved means for rendering the operation of one thereof and its associated clutch assembly totally independent of the operation of the other and its assembly, each of said valves thereby acting as a pressure regulator for insuring the intended operation of the respective other assembly.

Another more specific object is to provide a hydraulically controlled, drum type steering clutch employing an association of coaxially telescoped driving and driven members in which novel structural provisions are incorporated to facilitate greatly the dismantling of the clutch for servicing or the like, and subsequent reassembly of the parts.

Yet another object is to provide a construction of the foregoing type including a hydraulically operated friction clutch or like unit, a variable pressure dropping control valve for said unit, and a brake operatively associated therewith, together with common operating provisions for said valve and brake whereby the valve is actuated throughout its entire clutch pressure controlling range prior to operation of said brake.

The foregoing statements are indicative in a general way of the nature of the invention, but other and more specific objects will be apparent to those skilled in the art upon a full understanding of the construction and operation of the device.

Two specific embodiments of the invention are presented herein for purpose of exemplication, but it will be appreciated that the invention is susceptible of incorporation in still other modified forms coming equally within the scope of the appended claims.

In the drawings,

Fig. 2 is an enlarged view in vertical transverse section through the valve structure illustrated in Fig. 1, approximately along line 2—2 of the latter, showing the parts in zero pressure position thereof;

Fig. 3 is a somewhat enlarged view in section similar to Fig. 2, illustrating the relationship of the component control elements of said valve in a different, manually controlled, intermediate pressure position thereof;

Fig. 4 is a view in vertical section through another pressure reduction valve in accordance with a somewhat modified embodiment of the invention;

Fig. 5 is a fragmentary, somewhat conventionalized, side elevational view, in vertical section through the clutch housing of the mechanism, illustrating the invention as applied in a preferred embodiment to a steering clutch arrangement for a dual, endless track crawler-type vehicle; and Fig. 6 is a fragmentary top plan view of the structure shown in Fig. 5.

Figure 1:
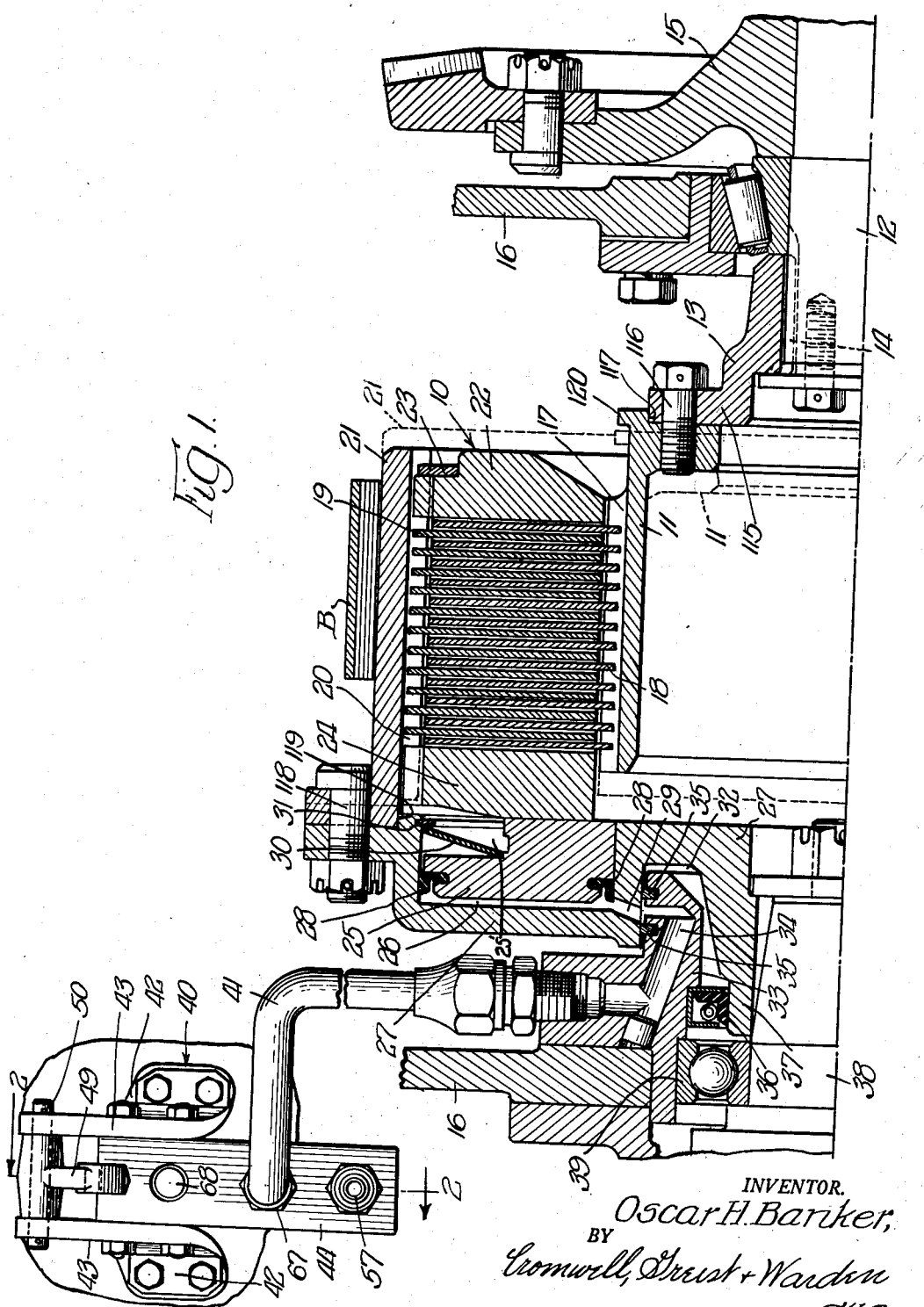
Fig. 1 is a fragmentary view in vertical, axial section through a hydraulically operated steering clutch mechanism adapted to be variably controlled by a graduated pressure reduction valve, which valve is illustrated in elevation in its operative, installed relation to said mechanism.

My copending application Serial No. 778,382 referred to above illustrates and describes a driving and steering mechanism for endless track, crawler-type vehicles, which mechanism embodies a disk-type clutch associated with a planetary device. This clutch is controlled by the selective, graduated release of hydraulic liquid normally effective thereon, from a normal, full operating line pressure to a zero pressure, fully dumped condition, in which the clutch is fully released. The present invention pertains, in one aspect, to improvements in a valve adapted to effect such a graduated pressure reduction. Although the valve is illustrated herein in a preferred dual installation controlling an improved form of steering clutch for endless track vehicles of the type referred to above, enabling a selective slip or non-slip frictional control of either track of the vehicle, it is to be understood that said valve is equally applicable to the driving and steering mechanism of the application above referred to, or to any other equivalent installation in which the regulation of a hydraulically controlled clutch or similar component is effected by a graduated reduction of the pressure normally operative thereon.

Referring to Fig. 1 of the drawings, the reference numeral 10 generally designates a disk-type steering clutch of the sort referred to above, it being understood that this structure is reproduced on the opposite side of the central driver for the assembly to be referred to. Corresponding parts of said other clutch are designated by similar reference numerals, primed. This clutch includes an internal, drum-like driving member 11 which is drivingly secured to a main drive shaft 12 by means of a drive ring 13 bolted on said drum and keyed or splined at 14 to said drive shaft. A retainer ring bolted to shaft 12 holds said drive ring in proper position. Shaft 12 is driven from a bevel gear 15 keyed on shaft 12, and suitable bearing provisions are made for rotatably mounting the shaft and other components of the assembly in the housing 16 of the structure.

The driving drum 11 is provided with external, elongated splines 17 receiving the friction clutch disks 18 in a non-rotative, axially slidable relation thereto. Another set of clutch disks 19 is similarly splined at 20 on an external driven drum 21 which is axially telescoped over the internal drum 11. An annular abutment 22 is also drivingly engaged with the splines 20 and is restrained in the axial direction by means of a retainer ring 23 associated with drum 21 in the manner illustrated. A conventional brake band B surrounds drum 21.

An annular pressure member 24 is splined to drum 21 at the opposite end of the clutch disk assembly and is normally pressure urged to the right, as illustrated in Fig. 1, to apply clutch engaging pressure on disks 18 and 19. An annular piston 25 is mounted for axial movement in an annular cylinder 26 which is defined by a shaped end plate 27 of the clutch drum assembly, said plate being bolted on the drum 21 for rotation therewith. Piston 25 is appropriately sealed to retain hydraulic pressure in the cylinder rearwardly thereof, as by means of a pair of conventional, annular oil seals 28, and hydraulic pressure is admitted to the cylinder through the inclined passages or ports 29 in plate 27. An annular, dished Belleville-type spring 30 normally urges the piston 25 to the left, as viewed in Fig. 1, the internal and external peripheries of said spring being engageable with said piston and with a retainer ring 31 which is fixedly associated with the end plate 27.

Said end plate 27 is shaped to provide an annular bearing recess 32 which receives a cylindrical, hydraulic pressure distributor head 33 fixed in the housing 16. This head is bored to provide a passage 34 through which hydraulic pressure liquid, such as a good grade of lubricating oil, is supplied to the cylinder 26 by means of port 29. Appropriate annular sealing rings 35 are disposed in parallel grooves on said head on either side of port 29 to prevent leakage of the liquid. A conventional oil seal 36 is applied to the pressure distributor head 33 between the latter and a hub extension 37 of the shaped drum end plate 27, to prevent leakage at this point. Said hub is appropriately secured in driving relation to the driven shaft 38, which is mounted by a ball bearing 39 in the interior of the hydraulic head 33.

The passage 34 through which hydraulic pressure is supplied to and voided from the clutch cylinder 26 is communicated with the pressure reduction valve of the present invention, generally designated 40, by means of a suitable pipe or other conduit 41, tapped in the hydraulic head 33 in the fashion illustrated. The valve 40 is mounted by an appropriate bracket 42 on a suitable support, for example, the clutch housing 16, and this bracket may include a pair of outwardly extending, laterally spaced, fork-like pivot arms 43 for a purpose to be described.

Referring now particularly to Figs. 2 and 3, wherein structural details of the valve 40 are illustrated, the latter includes a suitable chambered and ported casing 44 fixedly mounted on brackets 42, which casing has an internal, axially extending, cylindrical bore 45. The upper end of said bore is closed by a cylindrical plug 46 secured therein by a snap ring 47. This plug is in turn centrally apertured or bored for the slidable reception of an operating stem 48, and said stem is adapted to be manually actuated by the operator through a bell crank 49 which is pivoted at 50 on the bracket arms 43. One arm of this bell crank acts as a tappet provided with a roller 51 engaging with the end of valve control stem 48; the other arm is adapted to be connected by an element 52 with any suitable type of operator controlled, manual actuating lever, linkage or the like.

Control stem 48 extends coaxially through the valve bore 45 and is provided at its lower end with a cylindrical, barrel-shaped, double-seated valve element 53. This element is adapted to be manually actuated downwardly for sealing engagement of the frusto-conical lower valve seat 54 thereof with a correspondingly shaped seating surface 55 in the casing. Said seat 55 is located at the junction of bore 45 with an axially aligned, somewhat narrower hydraulic inlet passage 56, hydraulic liquid being admitted to said inlet passage through an inlet fitting 57 from a suitable pump or other source. A spring urged, cylindrical check member 59 controls the flow of fluid through fitting 57, yielding rearwardly under full line pressure to communicate said fitting with the passage 56. The spring loading of the check member 59 is such that it will yield under a full hydraulic line pressure of, say, 80 pounds per square inch.

A cylindrical sleeve-like by-pass control valve element 60 is disposed concentrically of the valve element 53, being disposed in leak-proof sliding relation to the valve bore 45. This by-pass element is provided with a conical valve seat 61 internally thereof and intermediate its length, for engagement with a corresponding conical seat 62 which is carried on the end of the valve element 53 opposite its aforesaid seat 54. The by-pass valve element 60 is axially engaged above said seat by a coiled compression spring 63 normally urging the same in a direction to engage the aforesaid seats 61, 62, this spring abutting the plug 46 at its opposite end.

The valve element 53 is axially housed within the by-pass element 60, beneath the seat 61 of the latter and within an integral depending skirt portion 65 thereof. This skirt portion is slotted around its lower extremity, as indicated at 66, for normal, full pressure communication of liquid in passage 56 with a radial port 67 opening to bore 45. Port 67 is in turn communicated by the above described connecting conduit 41 with the hydraulic distributor head 33, in the fashion described above and illustrated in Fig. 1. A further radial dump port 68 similarly connects the bore 45 at a relatively elevated point therein with atmosphere or a suitable low pressure receiver for the liquid which is dumped in the operation of the valve. The tubular by-pass element 60 includes an integral, upwardly projecting, sleeve-like stop portion 69 adapted for engagement with a depending skirt 70 on the plug 46 at the uppermost point in the axial travel of said by-pass element 60.

In operation, let it be assumed that in the position of the parts shown in Fig. 2, the valve 40 is in fully dumped position, i. e., that hydraulic pressure in the clutch control cylinder 26 has been dropped to zero by dumping through the conduit 41, port 67, interior of by-pass element 60, bore 45, and out the dump port 68. In this position of the parts, the seat 54 of valve 53 is positively engaged with the seat 55, by bell crank 49 acting on the stem 48, to shut off the supply of pressure liquid through inlet 57 to the valve bore 45. Accordingly, the conduit 41 is connected with dump port 68, through the space between seats 61, 62, to void the clutch cylinder 26.

If the operator now fully releases bell crank 49, full hydraulic pressure of about 80 pounds per square inch is effective on check member 59 to open communication of the pressure source with the passage 56, and said pressure is effective directly on the end of the valve element 53. Said element is thus elevated to engage its seat 62 against the seat 61 on by-pass element 60. The pressure is simultaneously communicated through port 67 and conduit 41 with the clutch cylinder 26, with the result that the clutch is fully applied to positively lock the drums 11, 21 for rotation as a unit.

While this is taking place, the two elements 53, 60 are urged as a unit upwardly against the force of spring 63, said upward travel of the elements 53, 60 being limited only by the engagement of the sleeve portion 69 of the latter with the depending stop skirt 70 of plug 46. When this takes place, the clutch 10 is fully engaged in its normal, hydraulically actuated condition, against the force of Belleville spring 30.

Assuming now that it is desired to produce slight slip between the clutch disks, with an attendant proportionate relative rotation of drums 11, 21, the bell crank 49 is actuated clockwise a predetermined amount to depress valve stem 48, thereby cracking the elements 53, 60 at the seats 61, 62, as illustrated in Fig. 3 in dotted lines. A certain volume of hydraulic liquid is immediately by-passed in the reverse direction from chamber 26 through conduit 41, port 67, the interior of the by-pass element 60, valve seats 61, 62, and dump port 68. The spring 63 acts on by-pass valve element 60 with its maximum force at this time, but does not seal the seat 61 of the element against the seat 62 of valve element 53, since the pressure of the hydraulic operating liquid through intake port or passage 56 opposes the spring force, in by-passing through the space between valve seats 61, 62 to the dump port 68. Such passing bleeds the full line pressure, thus maintaining the clutch engaging pressure, communicated through port 67 at the desired reduced value. Spring 63 in effect variably meters or calibrates the venting of pressure between seats 61, 62 in accordance with its degree of compression. This condition obtains until the valve stem 48 is again actuated downwardly for a further pressure drop or, if desired, the bell crank 49 is released, enabling line pressure to again elevate the elements 53, 60 to whatever extent is desired.

Sleeve-like by-pass element 60 floats in valve bore 45, within relation to the valve element 53, regulating the amount of intake pressure which is by-passed to dump port 68 and gradually reducing clutch engaging pressure, as described above, until it comes to rest against the lower end of valve bore 45, at which time valve element 53 seals off the intake pressure. At such time the space between seats 61, 62 is fully opened, and a zero clutch pressure condition is reached by voiding from intake port 67 past those seats to dump port 68.

The above described regulation of hydraulic pressure by manual operation to dump a desired pressure increment, followed by automatic spring re-sealing of the valve, affords a highly flexible and versatile control device operating on the principle of variable pressure reduction, as contrasted with variable pressure increase. The parts are exceedingly simple, rugged and satisfactorily operative over a long life of service.

The modified embodiment illustrated in Fig. 4 operates on the identical principle as the form described above. In this form, the tubular casing 70 is connected with the mechanism to be controlled through a lateral inlet fitting 71 in the form of a boss which is appropriately bored and tapped for communication of the clutch cylinder 26 with the main valve bore 72. The tubular by-pass plunger 73 has an O-ring 74 disposed in an annular groove 76 therein to effect an absolute, leak-proof seal between the same and the wall of bore 72. Said tubular plunger 73 is urged downwardly by means of a coil spring 77 encircling the reduced upper end portion thereof, said spring bearing at its upper end against the cylindrical plug 78 in the upper end of bore 72. The upper portion of the tubular member 73 serves as a pilot element, designated 79, which is axially guided for sliding movement by said plug 78.

The reference numeral 80 designates the elevated liquid dump port of the valve, which is communicated with the interior of the tubular plunger member 73 through a port 81 in the reduced portion of the latter. Member 73 slidably receives the operating stem 82 of the valve, which is controlled at its upper end by a manually operated bell crank 83. Stem 82 is reduced in diameter at 84 to provide a flow passage 85 between the stem and the element 73, through which liquid is voided by port 81 to the exterior of member 73, thence to dump port 80. At its lower extremity the stem 82 carries a cylindrical valve element 86 having an annular seating ring 87 applied thereto. Said ring is adapted for sealing engagement with the lower annular valve seating surface 88 on the element 73 immediately surrounding the inlet to passage 85. By-pass member 73 is normally supported in its fully extended position in the bore 72 by an annular skirt extension 89 engaging the bottom of said bore, said skirt extension being apertured at 90 for communication of the interior thereof with the clutch provided with a spring urged ball check 92.

The operation of this modified form generally follows the operation of the embodiment of Figs. 2 and 3. Successive manual actuation of the stem 82 results in unseating of the seating ring 87 from the coacting seat 88, thereby dumping hydraulic operating fluid through the conduit 41, port 71, opening 90, passage 85, and ports 81 and 80. The attendant reduction in pressure is immediately followed by spring urged re-seating of said seat 88 against the ring 87 to maintain the reduced pressure. Release of the bell crank 83 results in upward return of the elements 86 and 73 to their elevated, full line pressure position.

As stated above, the graduated pressure release valve of the present invention was specially devised for installation in association with a steering clutch for an endless track or crawler type of tractor, characterized by dual power shafts controlled independently of one another to govern the driving and steering of the tractor. Figs. 5 and 6 show an installation of this type. It may be considered that the separately illustrated housings 16, 16', disposed on opposite sides of the central drive gear 15, enclose identical hydraulically controlled clutch units such as the unit 10 shown in Fig. 1. These units serve to control the variable slip drive of the respective output shafts to which the track bull pinions are connected. The arrangement is similar to that illustrated and described in my copending application Serial No. 778,382 identified above, in that the operation of the respective hydraulically controlled clutches is coordinated with the application of the brake band B to the outer clutch drum 21. The sole difference is that in the present installation there is but a single operating lever and linkage assembly for each of the clutch units. This is distinguished from the dual operating assembly required in the construction of said application due to the planetary character of the mechanism illustrated therein. By the same token, certain lost motion provisions in the operating linkage are omitted in the present control structure shown in Figs. 5 and 6.

The bell crank operating member designated 52 in Fig. 2 is represented in Fig. 5 as a connecting rod which is pivoted to the bell crank 49. This rod is operatively connected, by means of a lost motion coupling 96, an encircling spring 97 and a further rod 98 secured to coupling 96, with the free end of a toggle-type brake actuating arm 99. Said arm is in turn operatively connected to brake band B by more or less standard provisions, generally designated 100, in such manner that a counterclockwise actuation of arm 99 results in application of the brake band B to the outer control drum 21 of the clutch unit 10. An actuating link 101 is pivoted at its ends to arm 99 and to the manual control lever 102 to operate the brake arm 99 and the control valve 44.

The relationship of the above parts is such that swinging of lever 102 in the counterclockwise direction, as viewed in Fig. 5, results in release and upward retraction of valve control stem 48 of the pressure reduction valve 44, with the result that full hydraulic line pressure is applied to the clutch unit 10 to engage the same and effect a direct drive connection from drum 11 to drum 21 and shaft 38. Under this condition, brake band B is fully withdrawn from drum 21 to allow free rotation thereof, prior to engagement of the clutch. Upon manipulation of lever 102 in the opposite, clockwise direction, the aforesaid valve stem 48 is depressed, the hydraulic pressure in clutch cylinder 26 is reduced to an extent proportionate to the amount of downward depression of the stem, and the Belleville spring returns clutch pressure piston 25 to proportionably reduce the friction force on the clutch disks.

Accordingly, when the operator of the tractor desires to make but a gradual turn, he rocks, to a slight degree in clockwise direction, the lever 102 which controls the side of the tractor toward which the turn is to be made. Due to the normal radial clearance between brake band B and the drum 21, the initial resulting movement of link 101, transmitted through rod 98, coupling 96 and rod 52, will slightly depress valve stem 48 without applying the brake band. This results in a partial dumping of hydraulic pressure by valve 44, in the manner described above. The pressure is held at the diminished value due to reseating of the element 60 against valve element 53. Further depression of stem 48 will further reduce the clutch pressure. Such pressure reduction in cylinder 26, small or large, is proportionately reflected in the amount of slip between clutch disks 18, 19, and rotation of outer drum 21 relative to the inner driving drum 11 of the clutch 10. Hence, since said outer drum is rigidly connected to the output shaft 38, a proportionate reduction in the speed of the latter takes place. If a dead track or full pivot turn is desired, lever 102 is fully actuated clockwise to fully dump the pressure and to stop drum 21 and the shaft 38 to which it is connected. The aforesaid brake band clearance permits the clutch to be fully disengaged before the drum 21 is braked sufficiently to halt the same. When lever 102 is again manipulated in the counterclockwise direction, the brake band is released and the clutch variably re-engaged depending upon the extent of the said manipulation of the lever and resultant pressure urged re-engagement of its disks 18, 19.

The provision of an efficient check valve structure of the type generally designated 59 in Figs. 2 and 3 is of considerable importance in a steering clutch installation of the type described, not only to the extent that it controls the individual operating characteristics of the valve of which it is a part, but also because this check in effect functions as a pressure control and regulator for the other valve 44' of the dual installation and its associated clutch. Inasmuch as the two pressure inlet fittings 57, 57' are connected to a common source of hydraulic pressure liquid, a voiding of the pressure in one clutch unit would tend to result in a reduction of the full line pressure intended to be effective on the other unit. These check members are in addition to the normal regulator valve (not shown) through which the system is supplied with hydraulic pressure from the pump or other source.

In the form illustrated in Fig. 2, the check valve 59 comprises an elongated cylindrical plug 105 which slidably fits the bore of inlet fitting 57, said plug being piloted in an integral cylindrical extension 106 of fitting 57 which is received in a cylindrical transverse bore 107 of the valve casing 44. The check member is urged to the left by a coil spring 108 in said last named bore, said spring surrounding a rearwardly extending pin 109 on the check member and abutting a shoulder 110 on the latter. The opposite end of said spring abuts an apertured retainer 111 which is secured to the housing.

In addition to the above features of improved construction and operation of the above assembly, in a general or organizational sense, the present invention presents various improved specific structural features. These deal particularly with the matter of facilitating and expediting disassembly or dismantling of the clutch sub-assembly from the driving and hydraulic control of sub-assemblies associated therewith. Such details are illustrated in Fig. 1 of the drawings, to which attention is directed.

It will be noted that the internal splined clutch drum 11 is secured to an outwardly extending flange 115 of the driving ring 13, by means of bolts 116, and that said drum is circumferentially recessed internally of its outer periphery at 117 to provide an annular pilot shoulder which telescopes over said flange 115. The outer splined control drum 21 is constructed separate from the shaped, hydraulic cylinder-defining end plate 27 thereof, being rigidly clamped to said plate by bolts 118 at adjacent radial flanges of said drum and end plate. Drum 21 is piloted on an annular shoulder 119 machined on the right-hand face of end plate 27.

When it is desired to remove the assembly of clutch drums 11, 21, abutment or backing plate 22, pressure member 24 and the clutch disks 18, 19 from the unit, as for servicing, repair or replacement of parts, this is simply and quickly performed in the following manner: The bolts 116 are removed and the internal drum 11 is slid to the left, as indicated in dotted lines in Fig. 1, until its pilot shoulder 117 is clear of the driving ring flange 115. Bolts 118 are then removed and the outer drum 21 is slid to the right to clear it from the pilot shoulder 119 of end plate 27, thus separating said drum from said end plate and further telescoping drums 11 and 21 relative to one another. Assuming that the brake band B has been previously disassembled from the various levers and links which operate the same (shown in Fig. 5), the band may then be utilized to lift the clutch sub-assembly, including the parts enumerated above, out of the clutch chamber of the housing 16.

Following the intended repairs, this sub-assembly is re-assembled by dropping it down into the casing, piloting external drum 21 on end plate pilot shoulder 119, bolting said drum to the end plate, and piloting and bolting the internal drum on the driving ring flange 115. This last named operation is facilitated by the provision of an annular shoulder 120 on the right-hand external periphery of said drum, for the reception of a crowbar or like implement to assist in shifting the drum toward the right and over the flange 115. These operations of removal and replacement of the clutch parts are accomplished without disturbing either the hydraulic installation to the left thereof or the driving components to the right.

Referring to Fig. 1, it will be noted than the annular recessing of the hydraulic piston 25 at 25' affords a chamber receiving the Belleville spring 30 and snap ring 31 by which the latter is supported to act on the piston. Thus the entire hydraulic unit of the clutch is held in assembly when the above described operations are performed. A very desirable overall compactness of structure is a further result.

Reference has been made to the provision of a lost motion feature in the connection of the operating lever 102 and link 101 to the bell crank 49, as shown in Fig. 5. This feature is required when a valve 44 of the type illustrated in Fig. 2 is employed. Spring 97 of lost motion coupling 96 is of sufficient strength to transmit the necessary force to depress valve stem 48 without compressing. However, assuming that, due to brake band wear, the band B has not been fully applied to drum 21 at the time the valve element 53 seats at 55, further brake-applying movement of link at 55 is made possible by the compressing of spring 97. Such lost motion provision is not necessary in the use of the valve shown in Fig. 4, for the plunger head 86 merely travels further in the axial inlet bore of the valve in the event of continued depression of valve stem 82.

It is imperative that in the fully seated position of the valve element 53 of Fig. 2, the pressure on the clutch be entirely voided. Therefore, the axial length of the skirt 65 of by-pass element 60 is made greater than that of the element 53. This insures unseating of the by-pass surfaces 61, 62 under the condition noted above, which is shown in Fig. 2. With reference to the form of Fig. 4, the ring 87 is properly positioned on plunger 86 for the same purpose of insuring an opening to the annular flow passage 85 when the member 86 is in inlet-closing position.

I claim:

1. A hydraulically controlled clutch construction comprising coaxial relatively rotatable driving and driven members, clutch elements mounted in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operatively connected with and operable to reduce pressure on said hydraulically actuable member in successive increments, during a given valve operating cycle, from a valve coupling said clutch elements in non-slip relation, and a pressure line communicating said valve with a source of hydraulic operating liquid, said dump valve including coaxial, axially movable valve elements which are axially exposed to the pressure in said line, at least one of said elements being urged axially by said pressure.

2. A hydraulically controlled clutch construction comprising coaxial relatively rotatable driving and driven members, clutch elements mounted in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operatively connected with and operable to reduce pressure on said hydraulically actuable member in successive increments, during a given valve operating cycle, from a value coupling said clutch elements in non-slip relation, and a pressure line communicating said valve with a source of hydraulic operating liquid, said valve comprising a hollow housing having an intake port communicating the interior thereof with said pressure line, a discharge port communicating said interior with said hydraulically actuable members and a dump port communicating said interior with a low pressure receiver, a manually actuable valve element shiftable in said housing interior to control liquid flow from said line through said intake port to said interior, and a further spring urged valve element shiftable in said housing with relation to said first named valve element to control liquid communication between said discharge and dump ports.

3. A hydraulically controlled clutch construction comprising coaxial relatively rotatable driving and driven members, clutch elements mounted in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, a pressure line communicating said valve with a source of hydraulic operating liquid, and a spring urged check member disposed in said line between said source and valve and opposing the pressure of said source, said valve comprising a hollow housing having an intake port communicating the interior thereof with said pressure line, a discharge port communicating said interior with said hydraulically actuable member, and a dump port communicating said interior with a low pressure receiver, a manually actuable valve element shiftable in said housing interior to control liquid flow from said line through said intake port to said interior, and a further spring urged valve element shiftable in said housing with relation to said first named valve element to control liquid communication between said discharge and dump ports.

4. A hydraulic pressure reduction control valve comprising a valve housing having an internal bore, a pressure inlet opening to said bore and a pair of outlet openings to said bore, one of which is a high pressure port and the other of which is a dump opening, a valve element disposed for sliding movement in said bore to seal said inlet opening from said outlet openings, a pressure by-pass element coaxial with said valve element and slidable in said bore, said elements defining therebetween an annular by-pass port located between said outlet openings, spring means normally urging said elements in a direction to close said port, and manually operable means acting on one of said elements in a direction to open said port.

5. A hydraulic pressure reduction control valve comprising a valve housing having an internal bore, a pressure inlet opening to said bore and a pair of outlet openings to said bore, one of which is a high pressure port and the other of which is a dump opening, a valve element disposed for sliding movement in said bore to seal said inlet opening from said outlet openings, a pressure by-pass element coaxial with said valve element and slidable in said bore, said elements defining therebetween an annular by-pass port located between said outlet openings, spring means normally urging said elements in a direction to close said port, and manually operable means acting on one of said elements in a direction to open said port, said last named means urging said valve element in a direction to close said inlet opening, said by-pass port being open when said valve element is in said last named position.

6. A graduated hydraulic pressure reduction control valve comprising a valve housing having an internal bore, a pressure outlet opening to said bore, and a pair of outlet openings, one of which is a high pressure port communicating said bore with a device to be controlled and the other of which is a dump opening communicating said bore with a low pressure receiver, an inlet valve seat in said housing downstream from said inlet opening, a valve member slidably mounted in said housing bore for engagement with and disengagement from said seat to control said inlet opening, means to positively actuate said valve member axially of said bore toward said seat, said valve member shifting away from said seat under pressure in said inlet opening following release of said last named means, a by-pass member slidable in said bore in coaxial relation to said valve member and defining an annular by-pass path therebetween from said inlet opening to said dump opening, said valve and by-pass members having coacting annular seating surfaces engageable to seal said path, and spring means urging said seating surfaces in a direction for engagement, said valve and by-pass elements being shiftable as a unit away from said inlet seat by pressure in said inlet opening when said actuating means is released.

7. A graduated hydraulic pressure reduction control valve comprising a valve housing having an internal bore, an inlet opening adapted to communicate said bore with a source of operating liquid under pressure, and a pair of outlet openings normally communicating said bore respectively with a device to be controlled and with a low pressure receiver, an inlet valve seat in said housing downstream from said inlet opening, a valve member slidably mounted in said housing bore for engagement with and disengagement from said seat, means to positively actuate said valve member axially of said bore toward and into engagement with said seat, said valve disengaging and shifting away from said seat under pressure from said source following release of said last named means, a by-pass member slidable in said bore in coaxial relation to said valve member, said valve and by-pass members having coacting seating surfaces adapted to engage to cut off communication of said inlet opening with said bore and with said receiver outlet opening, and spring means urging said seating surfaces in a direction for said engagement, said valve and by-pass elements being shiftable as a unit away from said inlet seat by pressure from said source when said actuating means is released.

8. A graduated hydraulic pressure reduction control valve comprising a valve housing having an internal bore, an inlet opening adapted to communicate said bore with a source of operating liquid under pressure, and a pair of outlet openings normally communicating said bore respectively with a device to be controlled and with a low pressure receiver, a spring urged check member operatively associated with said inlet opening to open the latter for communication with said bore only at full operating liquid pressure, an inlet valve seat in said housing downstream from said inlet opening, a valve member slidably mounted in said housing bore for engagement with and disengagement from said seat; means to positively actuate said valve member axially of said bore toward and into engagement with said seat, said valve disengaging and shifting away from said seat under pressure from said source following release of said last named means, a by-pass member slidable in said bore in coaxial relation to said valve member, said valve and by-pass members having coacting seating surfaces adapted to engage to cut off communication of said inlet opening with said bore and with said receiver outlet opening, spring means urging said seating surfaces in a direction for said engagement, said valve and by-pass elements being shiftable as a unit away from said inlet seat by pressure from said source when said actuating means is released.

9. A hydraulic pressure reduction control valve comprising a valve housing having an axial bore, an axially disposed inlet opening adapted to communicate said bore with a source of operating liquid under pressure and a pair of outlet openings spaced axially from said inlet opening, one of which is adapted to be communicated with a member to be controlled and the other of which is a low pressure dump opening, a manually actuable valve element shiftable axially toward and adapted to seal said inlet opening, a tubular by-pass element in telescoped external relation to said valve element, said valve and by-pass elements defining therebetween an annular by-pass port to said bore and being engageable with one another to close said port, spring means urging said by-pass element in a direction for port sealing engagement with said valve element, said controlled member outlet opening and dump outlet opening communicating freely with said bore on the respective downstream and upstream sides of said port, whereby to dump operating liquid from said controlled member through said port and dump opening when said elements are disengaged.

10. A graduated pressure release and control valve comprising a valve housing having an internal chamber, an inlet opening to said chamber adapted to be connected to a source of liquid under pressure, a supply opening adapted to be connected with a device to be controlled, and a dump opening, said housing having a control port between said inlet opening and supply opening, a pair of valve elements mounted for movement relative to one another in said chamber, one of said valve elements being engageable and disengageable with said port to control the same, said elements being engageable and disengageable with one another upon said relative movement thereof to open and close a dump path therebetween from said supply opening to said dump opening, means resiliently urging said valve elements to close said dump path, and manually operable means actuating said elements to open said path.

11. A graduated pressure release and control valve comprising a valve housing having an internal chamber, an inlet opening to said chamber adapted to be connected to a source of liquid under pressure, a supply opening adapted to be connected with a device to be controlled, and a dump opening, said inlet opening being in normal communication with said supply opening, said housing having a control port between said inlet opening and supply opening, a pair of valve elements mounted for movement relative to one another in said chamber, one of said valve elements being engageable and disengageable with said port to control the same, said elements being engageable and disengageable with one another upon said relative movement thereof to open and close a dump path therebetween from said supply opening to said dump opening, means resiliently urging one of said valve elements in a direction to close said dump path, and manually operable means actuating the other of said elements in the same direction to open said path, said other element being shiftable by said last named means to close said inlet opening.

12. A graduated pressure release and control valve comprising a valve housing having an internal chamber, an inlet opening to said chamber adapted to be connected to a source of liquid under pressure, a supply opening adapted to be connected with a device to be controlled, and a dump opening, a pair of valve elements mounted for movement relative to one another in said chamber, one of said valve elements being engageable and disengageable with said port to control the same, said elements being engageable and disengageable with one another upon said relative movement thereof to open and close a dump path therebetween from said supply opening to said dump opening, means resiliently urging said valve elements to close said dump path, manually operable means actuating said elements to open said path, and a spring urged check member controlling said inlet opening on the downstream side thereof.

13. A hydraulically controlled steering assembly comprising a pair of coaxially arranged clutch constructions, each of said clutch constructions comprising coaxial relatively rotatable driving and driven members, clutch elements mounted in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, a pressure line communicating said valve with a source of hydraulic operating liquid, and a spring urged check member disposed in said line between said source and valve and opposing the pressure of said source, said valve comprising a hollow housing having an intake port communicating the interior thereof with said pressure line, a discharge port communicating said interior with said hydraulically actuable member, and a dump port communicating said interior with a low pressure receiver, a manually actuable valve element shiftable in said housing interior to control liquid flow from said line through said intake port to said interior, and a further spring urged valve element shiftable in said housing with relation to said first named valve element to control liquid communication between said discharge and dump ports, the said source with which the respective pressure lines communicate being common to said pair of clutch constructions and the respective rotatable driving members being drivingly connected to a common driving device.

14. A hydraulically controlled clutch construction comprising coaxial relatively rotatable driving and driven members, clutch elements mounted in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, and a pressure line communicating said valve with a source of hydraulic operating liquid, said valve comprising a hollow housing having an intake port communicating the interior thereof with said pressure line, a discharge port communicating said interior with said hydraulically actuable member, and a drump port communicating said intake with a low pressure receiver, a manually actuable valve element shiftable axially in said housing interior to control liquid flow from said line through said intake port to said interior, and a further spring urged valve element shiftable axially in said housing into and out of engagement with said first named valve element to control liquid communication between said discharge and dump ports.

15. A hydraulically controlled clutch construction comprising coaxial relatively rotatable driving and driven members, clutch elements mounted in non-rotative relation to said respective members and adapted to be compressed to rotatively couple said members, said coupling varying as to relative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, a pressure line communicating said valve with a source of hydraulic operating liquid, and a spring urged check member disposed in said line between said source and valve and opposing the pressure of said source, said valve comprising a hollow housing having an intake port communicating the interior thereof with said pressure line, a discharge port communicating said interior with said hydraulically actuable member, and a dump port communicating said interior with a low pressure receiver, a manualy actuable valve element shiftable axially in said housing interior to control liquid flow from said line through said intake port to said interior, and a further spring urged valve element shiftable axially in said housing into and out of engagement with said first named valve element to control liquid communication between said discharge and dump ports.

16. A hydraulically controlled steering assembly comprising a pair of coaxially arranged clutch constructions, each of said clutch constructions comprising coaxial relatively rotatable driving and driven members, clutch elements mounted in non-rotative relation to said respective members and adapted to be compressed to rotatively couple said members, said coupling varying as to relative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, a pressure line communicating said valve with a source of hydraulic operating liquid, and a spring urged check member disposed in said line between said source and valve and opposing the pressure of said source, said valve comprising a hollow housing having an intake port communicating the interior thereof with said pressure line, a discharge port communicating said interior with said hydraulically actuable member, and a dump port communicating said interior with a low pressure receiver, a manually actuable valve element shiftable axially in said housing interior to control liquid flow from said line through said intake port to said interior, and a further spring urged valve element shiftable axially in said housing into and out of engagement with said first named valve element to control liquid communication between said discharge and dump ports, the said source with which the respective pressure lines communicate being common to said pair of clutch constructions and the respective rotatable driving members being drivingly connected to a common driving device.

17. A hydraulically controlled clutch construction, comprising coaxial relatively rotatable driving and driven members, clutch elements in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, and a pressure line communicating said valve with a source of hydraulic operating liquid, said valve comprising a hollow housing having an intake port communicating the interior thereof with said pressure line, a discharge port communicating said interior with said hydraulically actuable member, and a dump port communicating said interior with a low pressure receiver, a manually actuable valve element shiftable axially in said housing interior in a direction to close said intake port, a further valve element shiftable axially in said housing into and out of engagement with said first named valve element to control liquid communication between said discharge and dump ports, and a spring acting on said further valve element to floatingly oppose the pressure of said source on said further valve element, which acts to urge the latter out of engagement with said first named valve element when said intake port is opened by said first named valve element.

18. A hydraulically controlled clutch construction, comprising coaxial relatively rotatable driving and driven members, clutch elements in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, a pressure line communicating said valve with a source of hydraulic operating liquid, and a spring urged check member disposed in said line between said source and valve and opposing the pressure of said source, said valve comprising a hollow housing having an intake port communicating the interior thereof with said pressure line, a discharge port communicating said interior with said hydraulically actuable member, and a dump port communicating said interior with a low pressure receiver, a manually actuable valve element shiftable axially in said housing interior in a direction to close said intake port, a further valve element shiftable axially in said housing into and out of engagement with said first named valve element to control liquid communication between said discharge and dump ports, and a spring acting on said further valve element to floatingly oppose the pressure of said source on said further valve element, which acts to urge the latter out of engagement with said first named valve element when said intake port is opened by said first named valve element.

19. A hydraulically controlled steering assembly comprising a pair of clutch constructions, each of said clutch constructions comprising coaxial relatively rotatable driving and driven members, clutch elements in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, a pressure line communicating said valve with a source of hydraulic operating liquid, and a spring urged check member disposed in said line between said source and valve and opposing the pressure of said source, said valve comprising a hollow housing having an intake port communicating the interior thereof with said pressure line, a discharge port communicating said interior with said hydraulically actuable member, and a dump port communicating said interior with a low pressure receiver, a manually actuable valve element shiftable axially in said housing interior in a direction to close said intake port, a further valve element shiftable axially in said housing into and out of engagement with said first named valve element to control liquid communication between said discharge and dump ports, and a spring acting on said further valve element to floatingly oppose the pressure of said source on said further valve element, which acts to urge the latter out of engagement with said first named valve element when said intake port is opened by said first named valve element, the source with which said respective pressure lines communicate being common to said pair of clutch constructions.

20. A hydraulically controlled steering assembly comprising a pair of clutch constructions, each of said clutch constructions comprising coaxial rotatable driving and driven members, clutch elements in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operable to reduce pressure on said hydraulically actuable member in successive increments, during a given valve operating cycle, from a valve coupling said clutch elements in non-slip relation, a pressure line communicating said valve with a source of hydraulic operating liquid, and a spring urged check member disposed in said line between said source and valve and opposing the pressure of said source, said valve comprising a hollow housing having an intake port communicating the interior thereof with said pressure line, a discharge port communicating said interior with said hydraulically actuable member, and a dump port communicating said interior with a low pressure receiver, a manually actuable valve element shiftable axially in said housing interior in a direction to close said intake port, a further valve element shiftable axially in said housing into and out of engagement with said first named valve element to control liquid communication between said discharge and dump ports, and a spring acting on said further valve element to floatingly oppose the pressure of said source on said further valve element, which acts to urge the latter out of engagement with said first named valve element when said intake port is opened by said first named valve element, the source with which said respective pressure lines communicate being common to said pair of clutch constructions and the respective rotatable driving members being drivingly connected to a common driving device.

21. In a hydraulically controlled steering clutch, a pair of like, coaxially disposed, rotative clutch units, a common driving member operatively connected to said units, said units each including a hydraulic control device having a hydraulically operated member which normally acts to drivingly engage said clutch unit, a variable pressure reduction valve for each of said units, said valves being supplied by a common source of hydraulic pressure liquid and being operatively connected to said respective clutch control devices whereby to normally impose a predetermined minimum operating pressure on said member thereof, operating means for each of said valves to divert liquid from its respective control device through said valve to a lower pressure to thereby release said respective associated clutch unit, a spring urged check member associated with each valve between the same and said source and yieldable only under pressures at or above said minimum operating pressure, whereby upon operation of the associated valve to prevent undesired dropping of pressure in the control device associated with the other valve, a brake operatively associated with each of said clutch units to retard the same, means for actuating said brake, and common means for actuating the valve operating and brake actuating means of said respective units in sequence.

22. In a hydraulically controlled steering clutch, a pair of like, coaxially disposed rotative clutch units, a common driving member operatively connected to said units, said units each including a hydraulic control device having a hydraulically operated member which normally acts to drivingly engage said clutch unit, a variable pressure reduction valve for each of said units, said valves being supplied by a common source of hydraulic pressure liquid and being operatively connected to said respective clutch control devices whereby to normally impose a predetermined minimum operating pressure on said member thereof, each of said valves including a pair of coacting, relatively movable elements defining therebetween a liquid dump path from said associated control device to a low pressure discharge, a spring resiliently urging said valve elements in a direction to close said path, and valve operating means to open said path, whereby to divert liquid from the associated control device to said low pressure discharge and thereby release the associated clutch unit, a spring urged check member associated with each valve between the same and said source, said check member being yieldable only under pressures at or above said minimum operating pressure, whereby upon operation of the associated valve to prevent undesired dropping of pressure in the control device associated with the other valve, a brake operatively associated with each of said clutch units to retard the same, means for actuating said brake, and common means for actuating the valve operating and brake actuating means of said respective units in sequence.

23. A hydraulically controlled clutch assembly comprising a pair of like, coaxially disposed clutch units, a common driving member operatively connected to said units, said units each including a hydraulic control device having a hydraulically operated member which normally acts to drivingly engage said clutch unit, a common source of hydraulic operating liquid for said control devices, a variable pressure reduction valve interposed between each of said units and said common hydraulic source, which valves control the variable slip coupling effected by said respective clutch units by graduated reduction over a substantial range of the pressure applied thereon from said source, each of said valves comprising a housing having an inlet opening connected with said source, a pair of outlet openings, one of which is connected to the hydraulically operated member of the respective clutch unit and the other of which functions as a low pressure dump opening, a valve element controlling said inlet opening, a by-pass element engageable and disengageable with said valve element and adapted to communicate said outlet openings with one another when said elements are disengaged, spring means normally urging said elements for engagement with one another, and means to operate said valve member to control said inlet opening, and a resiliently urged check member associated with each of said pressure reduction valves between the same and said common hydraulic source, which check members are yieldable at or above minimum operating pressure for the respective hydraulic control devices, whereby upon operation of one valve to prevent undesired dropping of pressure in the control device associated with the other valve.

24. A hydraulically controlled clutch assembly comprising a pair of coaxial driven members, a separate clutch unit drivingly connected to each of said members, a common driving member operatively connected to said clutch units, a brake engageable with each of said members to retard the same, said units each including a hydraulic control device having a hydraulically operated member which normally acts to drivingly engage said clutch unit, a common source of hydraulic operating liquid for said control devices, a variable pressure reduction valve interposed between each of said units and said common hydraulic source, each of said valves comprising a housing having an inlet opening connected with said source, a pair of outlet openings, one of which is connected to the hydraulically operated member of the respective unit and the other of which functions as a low pressure dump opening, a valve element controlling said inlet opening, a by-pass element engageable and disengageable with said valve element and adapted to communicate said outlet openings with one another when said elements are disengaged, and spring means normally urging said elements for engagement with one another, a resiliently urged check member associated with each of said pressure reduction valves between the same and said source, which check member is yieldably at or above minimum operating pressure for the respective hydraulic control devices, individual actuators for said respective valve elements operative to control said respective valve inlet openings, and means to operate said respective actuators including means to operate said respective brakes in synchronized relation thereto.

25. A hydraulically controlled steering assembly including a pair of clutch constructions each comprising coaxial relatively rotatable driving and driven members, clutch elements mounted in non-rotative relation to said respective members and adapted to be compressed to rotatively couple said members, said coupling varying as to relative rotative slip of said members in accordance with the force of said axial compression, a hydraulically actuable member acting on said clutch elements to compress the same, a graduated pressure dump valve operatively connected with and operable to reduce pressure on said hydraulically actuable member in successive increments, during a given valve operating cycle, from a valve coupling said clutch elements in non-slip relation, a common source of hydraulic operating liquid for said clutch constructions, and a pressure line communicating said dump valve with said source, said dump valves each including coaxial, axially movable valve elements which are axially exposed to the pressure in said line, at least one of said elements of each dump valve being urged axially by said pressure.

26. A steering assembly in accordance with claim 25, in which a resiliently biased check valve is provided in said pressure line between said common source and each of said dump valves to yieldably oppose pressure supplied to the latter.

OSCAR H. BANKER.

References Cited in the file of this patent

UNITED STATES PATENTS

| Number | Name | Date |
|---|---|---|
| 382,643 | Fox | May 8, 1888 |
| 728,572 | Hanson | May 19, 1903 |
| 876,543 | Hanson | Jan. 14, 1908 |
| 1,298,956 | Johnson | Apr. 1, 1919 |
| 1,566,111 | Miller | Dec. 15, 1925 |
| 1,864,126 | Ferris | June 21, 1932 |
| 1,872,250 | Coughtry | Aug. 16, 1932 |
| 1,897,432 | Klotzman | Feb. 14, 1933 |
| 1,910,084 | Bixby | May 23, 1933 |
| 1,932,039 | Hewitt | Oct. 24, 1933 |
| 2,077,988 | Cossey | Apr. 20, 1937 |
| 2,098,342 | Knutzen | Nov. 9, 1937 |
| 2,151,153 | Rode et al. | Mar. 21, 1939 |
| 2,191,669 | Kress | Feb. 27, 1940 |
| 2,282,143 | Carter | May 5, 1942 |
| 2,328,606 | Boldt | Sept. 7, 1943 |
| 2,412,436 | Vanderzee | Dec. 10, 1946 |
| 2,437,670 | Adamson | Mar. 16, 1948 |
| 2,501,706 | Bent | Mar. 28, 1950 |

FOREIGN PATENTS

| Number | Country | Date |
|---|---|---|
| 24,189 | Great Britain | 1912 |
| 507,673 | Germany | Aug. 9, 1927 |
| 552,640 | Germany | May 26, 1932 |